United States Patent [19]
Hilbush, III

[11] Patent Number: 5,413,385
[45] Date of Patent: May 9, 1995

[54] UNDERGROUND COLLAR

[75] Inventor: Edward O. Hilbush, III, West Chester, Pa.

[73] Assignee: WCC Industries, Inc., West Chester, Pa.

[21] Appl. No.: 184,552

[22] Filed: Jan. 21, 1994

[51] Int. Cl.$^6$ ............................................. F16L 55/175
[52] U.S. Cl. ........................................ 285/15; 285/293; 285/294; 264/32; 405/154
[58] Field of Search .................. 285/15, 21, 96, 106, 285/292, 293, 294; 138/97; 264/32, 36, 262, 263, 267; 405/154

[56] References Cited

U.S. PATENT DOCUMENTS

| | | | |
|---|---|---|---|
| 2,163,261 | 6/1939 | Norton | 138/97 |
| 3,141,478 | 7/1964 | Copeland | 285/294 X |
| 3,260,280 | 7/1966 | Buczala et al. | 138/97 |
| 3,265,782 | 8/1966 | Rosengarten et al. | 264/32 |
| 3,368,005 | 2/1968 | Buczala et al. | 285/294 X |
| 4,053,176 | 10/1977 | Hilbush | 285/93 X |

FOREIGN PATENT DOCUMENTS 1541581 10/1968 France ............................ 285/294

OTHER PUBLICATIONS

A&L Underground Vacuum Excavating Group Brochure, date unknown.

*Primary Examiner*—Dave W. Arola
*Attorney, Agent, or Firm*—Henry H. Skillman; Dann, Dorfman, Herrell and Skillman

[57] ABSTRACT

A mold collar and method for remotely sealing a joint between pipeline segments located at a depth greater than arm's length below the ground surface. The mold collar comprises a flexible sheath contoured generally in the shape of the joint to envelop the outer surface of the joint upon installation. The sheath includes a installation clips which hold the sheath in position on the joint while closure flaps and sealing bands are remotely fastened on the collar using grappling tools operated by workmen at the ground surface. The method comprises remotely positioning, installing, and sealing the collar about the joint, and then infusing the joint with sealant to form a leak-proof seal about the joint.

29 Claims, 4 Drawing Sheets

UNDERGROUND COLLAR

FIELD OF THE INVENTION

The present invention relates to the maintenance and repair of underground pipelines and more particularly to a novel collar for encasing and sealing the joint between underground pipeline segments.

BACKGROUND OF THE INVENTION

When installing and maintaining underground fluid pipelines, the joints between pipe segments are encased in a collar which is filled with a sealant to prevent leakage of fluid through the joint. In large pipelines, the joints are of the bell-and-spigot type. The collar often comprises a flexible sheath which is wrapped around the pipe in the area of the joint and is secured thereto by metal or plastic strapping. The sheath includes a fitting through which a suitable sealant may be introduced into the interior of the sheath around the joint. The sealant is confined by the sheath so that it may cure and provide a leakproof seal around the joint. In some cases the sealant is sufficiently fluid to be poured into the sheath manually; however, it is preferable to employ a more viscous sealant material which must be pumped into the interior of the sheath to provide a localized mass of sealing material which readily cures without danger of penetration into the interior of the piping. In such instances, the sheath may be provided with a vent fitting which permits the injected sealant to exhaust any residual air from the interior of the sheath.

When the sealed joint is formed in a pipeline system located close to the ground surface, i.e., within arm's length of the ground surface, workmen have no difficulty in manually wrapping the sheath about the joint. When the pipeline system is located more than an arm's length below the ground surface, an excavation surrounding the joint must be prepared to allow a workman access to the joint for manually installing the collar to seal the joint. The excavation must be sufficiently large to permit the workman to physically enter the excavation and manipulate the sheath around the joint.

Preparing an enlarged excavation according to this procedure substantially increases the time and expense needed to seal the joint. Further, workmen often shortcut the need for a full size excavation by suspending a workman head-downwards into the excavation for the purpose of applying the sheath. Such a practice is contrary to safe work rules and may lead to improper installation of the collar around the joint. Additionally, even when a workman properly prepares and enters a full excavation, the workman risks intoxication or suffocation from toxic liquids leaking from the joint, or great bodily injury from a collapsing excavation.

SUMMARY OF THE INVENTION

The present invention overcomes the problems of the installation or maintenance of a sealed joint at a depth greater than arm's length by providing an improved mold collar for joints which may be remotely handled and installed in place around the joint by workmen at the ground surface by using grappling tools. Workmen need not physically enter the excavation and manually handle the collar.

More specifically, the present invention provides a flexible collar which can be wrapped around the outer surface of the joint and adjacent portions of the pipeline on opposed sides of the joint to form a mold on the joint to contain a curable sealant. The flexible collar comprises a slitted sheath contoured generally in the shape of the joint. The sheath has closure flaps formed on opposed ends of the sheath defined by the slit. The closure flaps overlap and affix to each other to close the sheath along the slit and envelop the outer surface of the joint.

The collar includes a plurality of spring clips embodied in the sheath to firmly position the sheath in position around the pipe joint independent of the closure flaps, allowing manipulation of the closure flaps by workmen above the ground surface of the excavation using grappling tools. The collar further includes an infusion port which provides a fitting for connection of an infusion hose for injection of sealant into the interior of the collar installed on the joint. The collar also includes a exhaust or vacuum port which provides a fitting for connection of a vacuum hose for evacuating air out of the interior of the sheath to assist in evenly and thoroughly distributing the sealant around the joint.

DESCRIPTION OF A PREFERRED EMBODIMENT

Figure 1:
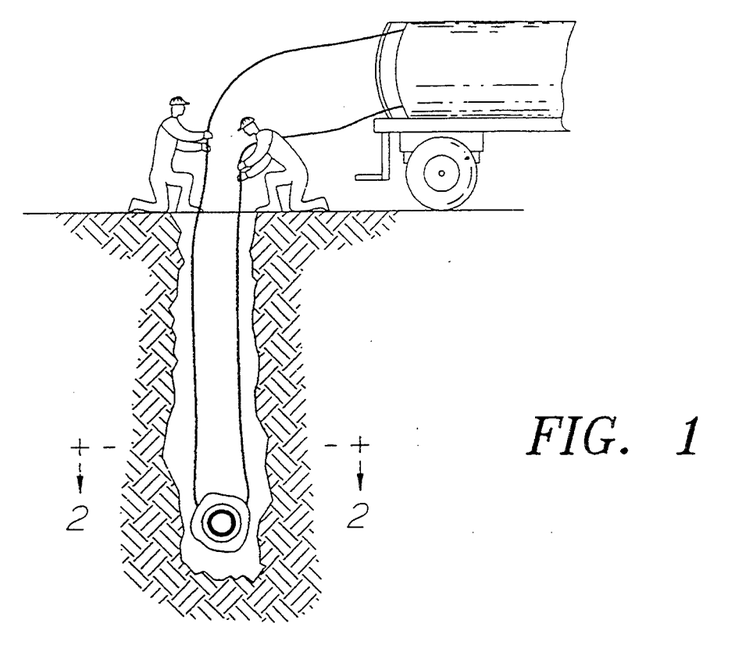
FIG. 1 is a schematic illustration of workmen remotely installing the mold collar of the present invention on an underground joint utilizing the joint sealing method of the present invention.

The apparatus and method of the present invention for remotely sealing an underground pipeline joint is schematically illustrated in FIG. 1. Maintenance workers 14 initially expose the pipeline 10 in the vicinity of the pipeline joint 16 by digging a trench 8 using an excavating device well known in the art. As illustrated in FIG. 1, the widthwise dimension W, of the trench 8 need only be slightly larger than the diameter of the pipeline joint 16 itself. The lengthwise dimension of the trench 8 need only be slightly larger than the length of the collar. The dimensions of the excavation necessary for practicing the method of remotely sealing an underground joint according to the present invention are significantly smaller than the dimensions necessary for practicing prior art joint sealing methods which require preparation of a trench large enough to accommodate a workman positioned underground and in the vicinity of the pipeline joint.

In accordance with the present invention, the mold collar, designated generally by reference numeral 20, is positioned on the pipeline joint by workmen 14 at the surface by "fishing" the collar around the pipeline joint using guide lines, such as connecting hoses 22 and 24, and securing the collar thereto by locking fasteners and sealing bands on the collar. The workmen can handle and install the collar in place around the joint from the ground surface using grappling tools and need not physically enter the excavation at any time. After the collar is installed, a sealant is injected into the interior of the sheath to provide a leak-proof seal around the joint. After the sealant has cured, the excavation is filled in with the collar still installed around the joint.

The mold collar of the present invention 20 comprises a bicomponent sheath which envelops the joint 16 after installation and provides a mold for containing a sealant while the sealant cures and forms a leak-proof seal around joint. The outer layer of the sheath comprises a layer of imperforate material such as oil cloth. The inner layer of the sheath comprises a layer of compressible material such as urethane foam. The sheath 30 envelops the joint 16 by wrapping around the outer surface of the joint and the pipeline 10 immediately adjacent the joint.

Figure 3:
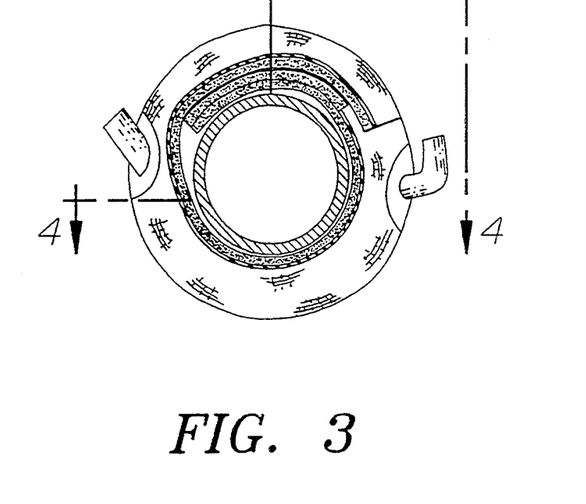
FIG. 3 is a sectional view taken along line 3—3 of FIG. 2 illustrating the overlapping closure flaps of the mold collar.
Figure 5:
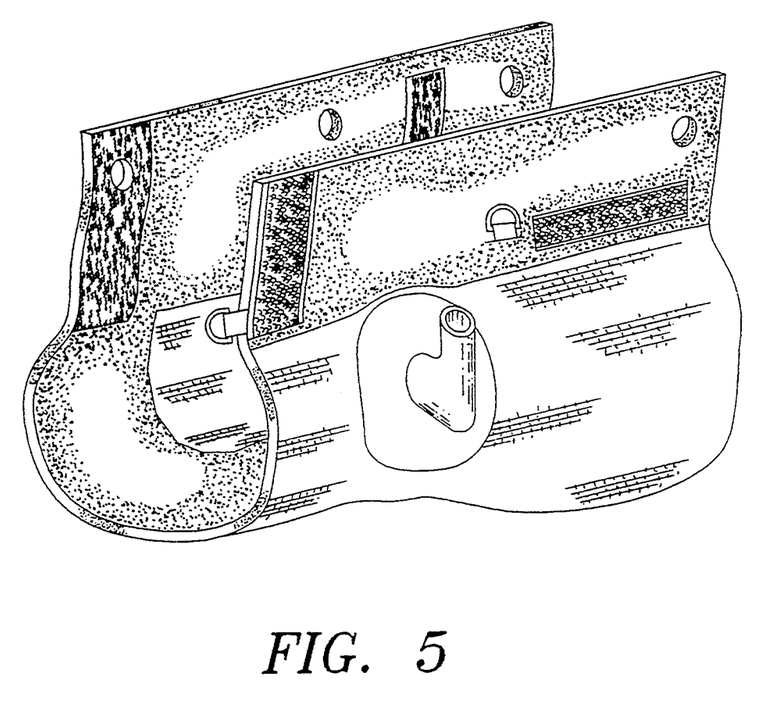
FIG. 5 is a perspective view of the mold collar in an open or expanded orientation for installation over a joint; and, FIG. 6–8 are schematic illustrations of the method steps of the present invention for remotely sealing an underground joint located at a depth greater than arm's length.

Referring to FIG. 5, the sheath has an intermediate body portion contoured generally in the shape of the joint to envelop the outer surface of the joint and pipeline immediately adjacent opposed sides of the joint. The sheath 30 has a slit 33 along its length defining opposed ends 31 of the sheath 30. Closure flaps 36 are formed on the opposed ends 31 of the sheath 30. The closure flaps 36 overlap to close the sheath along the slit and form a continuous outer surface around the joint as seen in FIG. 3.

The closure flaps are flexible and affix to each other to secure the collar on the joint 16. In order to releasably interlock the closure flaps to each other, each closure flap is preferably provided with a plurality of fasteners, preferably velcro tabs, which interlock with cooperating fasteners on the opposed closure flap. Preferably, the fasteners are oriented in such a manner that precise alignment of one closure flap with respect to the other is not necessary in order to interlock the closure flaps. For example, mating pieces of the velcro tabs may be oriented in directions transverse to one another, as seen in FIG. 5. The closure flaps 36 are also provided with eyelet means such as a plurality of apertures 40 or loops 42 for manipulating the closure flaps 36 using grappling tools operated by workmen above the ground surface of the excavation. The apertures are preferably located along the free edge of one of the closure flaps which is remote from the sheath as seen in FIG. 5. The loops 42 extend from the other flap at the junction of the other flap with the sheath.

Figure 2:
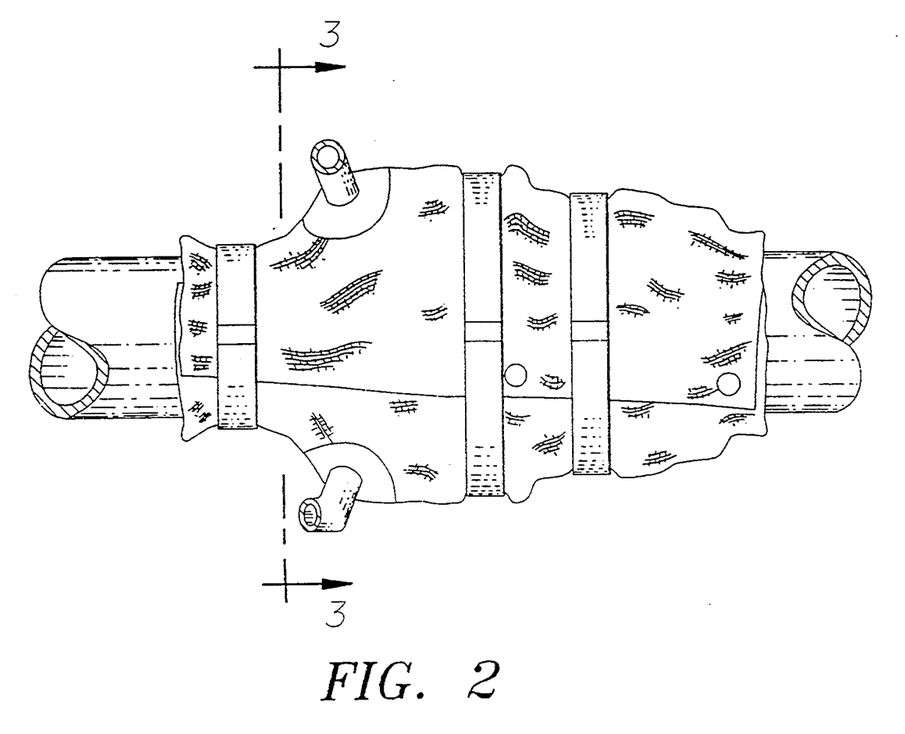
FIG. 2 is a side elevation of a preferred embodiment of a mold collar fully installed around an underground joint and adjacent portions of the pipeline on opposed sides of the joint.
Figures 4, 4A:
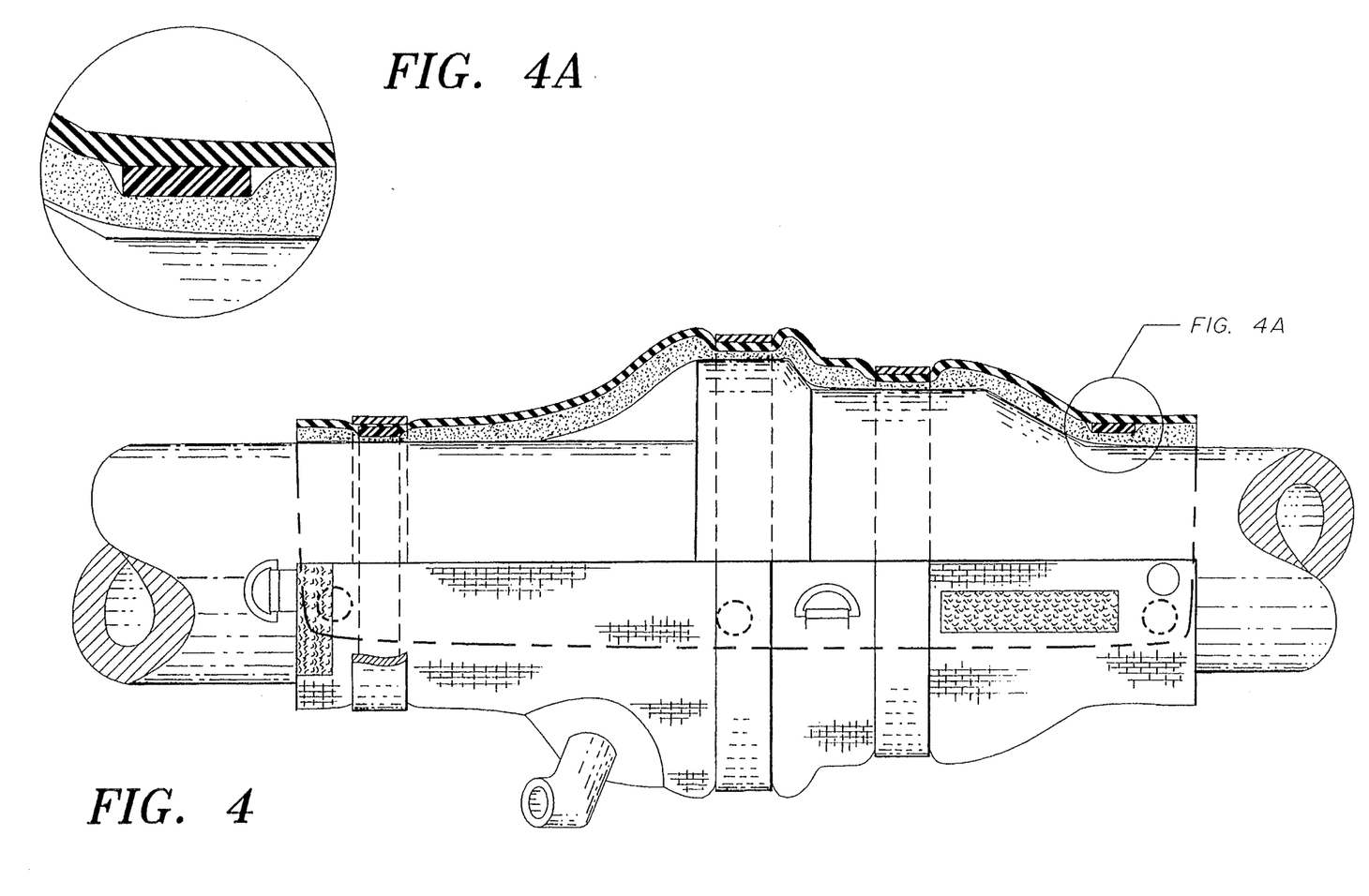
FIG. 4 is a partial sectional view taken along line 4—4 of FIG. 3 illustrating a fully installed mold collar on the underlying joint and adjacent pipeline portions.
FIG. 4A is an enlarged sectional view taken from the encircled portion of FIG. 4 illustrating an installation clip formed in between layers of the bicomponent sheath on the collar.

In a preferred embodiment of the invention, the mold collar 20, when enclosed around the joint 16, is generally bell-shaped to conform with a bell-and-spigot type pipeline joint. As seen in FIGS. 2 and 4, the mold collar 20 completely envelops the pipeline joint 16 and a portion of the pipeline 10 immediately adjacent opposed sides of the joint 16.

The sheath contains a plurality of installation clips, such as spring clips 44, which extend circumferentially around and are secured to said sheath, preferably embodied therein between the two layers of the bicomponent sheath as illustrated in FIGS. 4 and 4A axially spaced from a mono-layer strip 52, discussed in detail below. The installation clips 44 are preferably spring clips in the shape of a segmented circular band and act as skeletal members within the sheath to define its shape and cause the sheath to generally conform to the outline of the joint and adjacent pipeline portions. The installation clips bias the opposed ends of the sheath towards each other in a closed position as seen, for example, in FIG. 7. The opening or segmented portion of each spring clip is expandable beyond the diameter of the pipeline and joint to allow the spring clip and sheath to be installed over the joint 16 by pulling the closure flaps in opposed directions as seen, for example, in FIG. 5.

Figure 7:
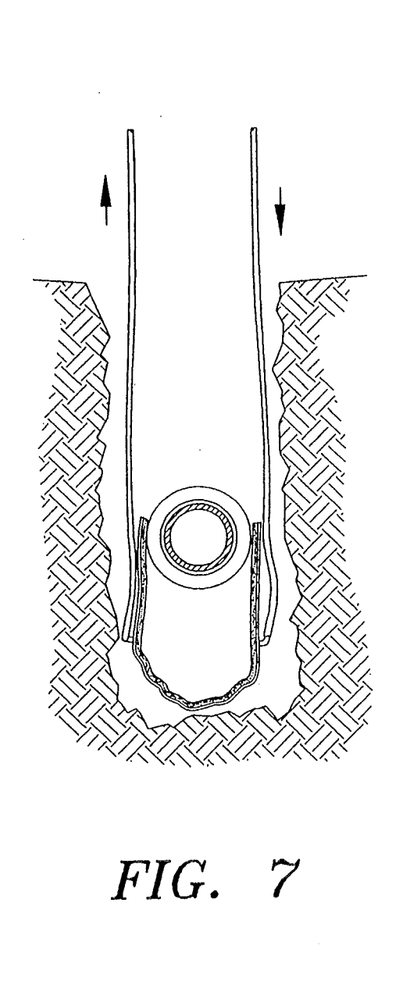
Figure 8:
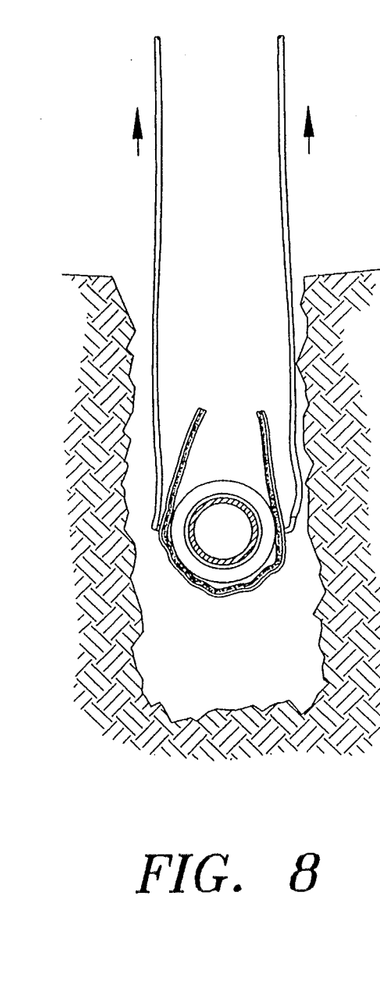

Referring to FIG. 7, the sheath is shown in a closed orientation forming a sleeve with only a small axial slit or opening 33. In the open orientation shown in FIG. 5, the spring clips become generally U-shaped. Upon installation on the pipeline joint 16, the spring clips 44 contract on the portions of the pipeline 10 immediately adjacent the joint 16 to firmly position the sheath in position and retain the sheath around the joint as seen in FIG. 8. After the sheath is positioned around the joint 16, the closure flaps 36 may then be manipulated by a workman using grappling tools to close the sheath and form the collar 20 around the outer surface of the joint 16.

The sheath is provided with passage means such as an inlet or infusion port 32 and a exhaust or vacuum port 34. The inlet port 32 and vacuum port 34 are located in a mono-layer strip 52, discussed in detail below, formed in the sheath. The infusion port 32 provides a fitting for connection to an infusion hose 22 which is connected to a sealant supply source 12 at the ground surface of the excavation. The infusion hose 22 and infusion port 32 provide a continuous, enclosed internal passage for infusion of sealant from the sealant supply source 12 into the interior of the sheath around the joint. The exhaust or vacuum port 34 provides a fitting for connection to a vacuum hose 24 which is connected to a source of vacuum above the ground surface of the excavation, or may be left open to the atmosphere to provide a natural vent, in which event the vacuum port serves as a vent port. The vacuum hose 24 and vacuum port 34 provide a continuous, enclosed internal passage for evacuating air out of the interior of the sheath around the joint in order to more evenly and thoroughly distribute the sealant around the joint.

The mold collar is also provided with a plurality of sealing bands 48 which are installed around the external circumference of the mold collar to more effectively seal the mold collar around the pipeline joint. The sealing bands are preferably offset from the installation clips and may exceed the number of spring clips 44. The sealing bands are preferably installed around the collar between the spring clips 44 as seen in FIG. 4. Referring to FIGS. 2 and 4, preferably three sealing bands are provided along the length of the mold collar. Two of the sealing bands 8a and 48c are preferably provided on the portions of the pipeline immediately adjacent opposed sides of the joint. A third sealing band 48b is preferably provided directly around the circumference of the bell portion 16a of the joint.

Referring to FIG. 4, when the mold collar is installed and fastened around the pipeline joint, an internal hollow space 50 is created in the vicinity of the portion of the joint 16 upon which sealant is to be applied to provide a leak-proof seal around the joint. The hollow space is created because the sheath, while contoured generally to the shape of the joint, is not completely form fitting. Further, the sheath has an internal mono-layer strip 52 transverse to the slit. The strip is formed by omitting a strip section of the internal layer of compressible material and, thus, the mono-layer strip comprises only the imperforate outer layer. Sealant is injected into the hollow space 50 through the infusion port 32, located in the mono-layer strip, and is confined therein by the sheath until the sealant cures and provides a seal around the joint. Once the sealant forms a seal around the joint, the excavation is then restored by the workmen with the mold collar remaining installed on the joint.

The novel design of the mold collar of the present invention facilitates remote, i.e. without the need for the workman to physically enter the excavation, installation of the collar around the joint by workmen above the ground surface of the excavation even in situations where the joint is located at a depth greater than arm's length. The procedural steps for installing the mold collar of the present invention are illustrated in FIGS. 6–8.

Figure 6:
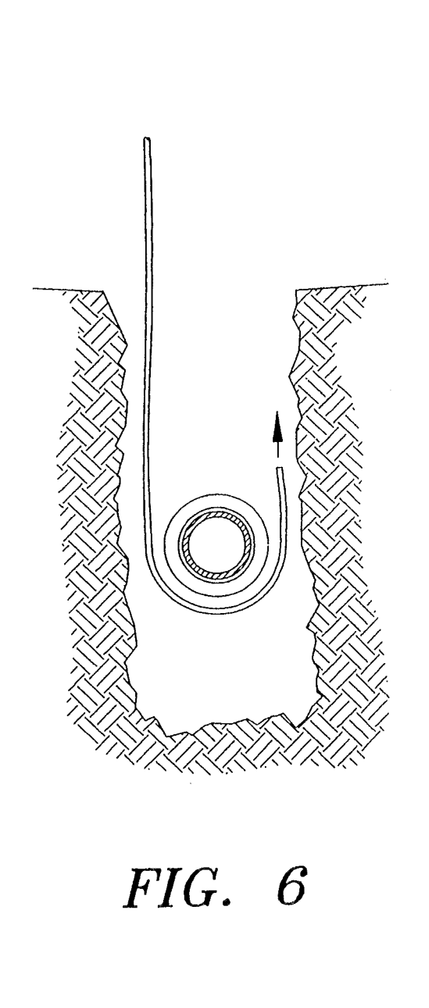

After a trench 8 has been excavated to expose the pipeline in the vicinity of the pipeline joint, a first guide line, such as infusion hose 22, is guided down the trench, around the underside of the pipeline 10, and up the opposed side of the trench to the ground surface of the excavation in the direction shown by arrows in FIG. 6. The free end of the infusion hose is then connected to the infusion port 32; a vacuum hose is then connected to the vacuum port 34. If it is permissible to vent directly into the excavation, a flexible leader may be connected to the vacuum port (which will serve as a vent port). The sheath is then guided downward to the underside of the pipeline by moving the infusion hose 22 and vacuum hose 24 in the direction shown by arrows in FIG. 7. These initial installation steps can be accomplished by using the infusion hose and vacuum hose in a reverse order.

As can be seen in FIG. 7, the sheath is naturally oriented into a closed position due to the normal bias of the installation clips 44. In order to open and partially install the sheath around the joint, workmen above the ground surface grasp the closure flaps 36 from both sides of the pipe using grappling tools and pull the closure flaps upward until the sheath envelops or wraps around the pipeline as seen in FIG. 8. The workmen then fully install the collar by overlapping the closure flaps 36 to form the mold collar around the pipeline joint. Next, sealing bands 48 are installed around the outer circumference of the mold collar to secure the mold collar to the pipeline joint. Once the mold collar is securely installed, sealant is injected into the interior 50 of the sheath through the infusion hose 22 and infusion port 32. Simultaneously, if a source of vacuum is used a vacuum is applied to the interior of the sheath through the vacuum hose 24 and vacuum port 34 in order to more thoroughly and evenly distribute the sealant within the interior of the mold collar.

Once a sufficient amount of sealant is infused into the mold collar, the infusion hose 22 and vacuum hose 24 are removed. In practice, the sealant is allowed to travel into the vacuum hose for a distance of five or six inches or six inches or until it is detected that all air pockets are eliminated, for example by termination of all jerky movements of the sealant. At that point, the vacuum port or the vacuum hose is sealed off by crimping or other mechanical means, and the hose is freed from the collar. While pressure is still applied to the sealant the infusion tube is crimped or mechanically sealed and the infusion tube is removed from the source and the collar. The sealant is then permitted to cure within the interior of the mold collar to provide a leak-proof seal around the joint. Once the seal is formed, the excavated trench can then be restored by the workmen with the mold collar remaining affixed around the pipeline joint.

The method and apparatus for sealing an underground pipeline joint of the present invention provides several advantages over the prior art. The method for sealing underground joints of the present invention is quicker and less expensive than the methods used in the prior art since the time-consuming and costly procedure of excavating and restoring a trench large enough to accommodate one or more workmen is eliminated. Using the method of the present invention, the length and width of the excavation need only be slightly larger than the lengthwise and widthwise dimensions of the pipeline joint. Further, since surface restoration is often the most expensive part of such underground work, surface restoration efforts are minimized since the dimensions of the excavation itself are minimized.

The method of encasing and sealing underground joints of the present invention is also much safer than the methods used in the prior art. Most often, underground pipeline joints are only resealed when leaking requires resealing. Using prior art techniques, a workman is required to enter the excavation trench in which inflammable, toxic, or otherwise deleterious fluids are leaking. Using the apparatus and method of the present invention, workmen need not enter the excavation trench and contact such deleterious fluids.

The terms and expressions which have been employed herein are used as terms of description and not of limitation. Use of such terms and expressions does not exclude any equivalence of the features shown and described or portions thereof. It is recognized that various modifications of the features shown and described herein are possible within the scope of the following claims.

I claim:

1. A collar for remotely sealing a joint between pipeline segments located at a depth greater than arm's length below the ground surface, comprising:
   a) a sheath contoured generally in the shape of the joint to envelop the outer surface of the joint and the portions of the pipeline immediately adjacent opposed sides of the joint upon installation, said sheath having a slit along its length defining opposed ends of said sheath;
   b) closure flaps formed on said opposed ends of said sheath, said flaps having eyelet means and being constructed and arranged to overlap and affix to each other to close said sheath along said slit and envelop the outer surface of the joint and adjacent pipeline portions;
   c) a plurality of installation clips on said sheath to cause said sheath to generally conform to the outline of the joint and adjacent pipeline portions, and to position and hold the body of said sheath on said joint and adjacent pipeline portions independent of said closure flaps; and
   d) passage means to afford infusion of sealant into the interior of said sheath;
   whereby said collar can be installed remotely around the joint and adjacent pipeline portions with said closure flaps overlapped to form a collar by using grappling hooks engaging said eyelet means, and by introducing a0 sealant through said passage means so that the interior of said collar is infused with sealant to form a leak-proof seal around the joint.

2. The collar recited in claim 1 wherein said installation clips comprise generally circular spring clips expandable beyond the diameter of the adjacent pipeline portions and contractable around the pipeline.

3. The collar recited in claim 2 wherein said spring clips are biased in a closed position.

4. The collar recited in claim 3 wherein said spring clips extend circumferentially around and are secured to said sheath, whereby the spring clips and slit are expandable as a unit by pulling said closure flaps in opposed directions.

5. The collar recited in claim 4 having a bicomponent sheath comprising a compressible inner layer and an outer layer operable to confine said sealant within the interior of said collar.

6. The collar recited in claim 5 wherein said installation clips are located between said inner layer and said outer layer.

7. The collar recited in claim 5 wherein said bicomponent sheath includes a mono-layer strip transverse to said slit comprising only said outer layer.

8. The collar recited in claim 7 wherein said installation clips are located in the bicomponent portion of the sheath axially spaced from said mono-layer strip.

9. The collar recited in claim 7 wherein said passage means comprises an inlet port located in the mono-layer strip.

10. The collar recited in claim 9 including a exhaust port for evacuating air out of the interior of said sheath.

11. The collar recited in claim 10 wherein said exhaust port is located in the mono-layer strip.

12. The collar recited in claim 1 further comprising a plurality of fasteners on said closure flaps which releasably interlock to retain said closure flaps affixed to each other.

13. The collar recited in claim 12 wherein said fasteners comprise complementary hook-and-loop fabrics.

14. The collar recited in claim 1 wherein said eyelet means of the closure flaps include a plurality of loops constructed and arranged to cooperate with grappling tools for manipulating said closure flaps.

15. The collar recited in claim 1 wherein said eyelet means of the closure flaps include a plurality of apertures constructed and arranged to cooperate with grappling tools for manipulating said closure flaps.

16. The collar recited in claim 15 wherein said apertures are positioned along the free edge of one of said closure flaps which is remote from said body.

17. The collar recited in claim 16 wherein said eyelet means includes loops extending from the other of said closure flaps at the junction of said other closure flap with said body.

18. The collar recited in claim 17 including complementary hook-and-loop fabric elongated strips secured to the surfaces of the two closure flaps which confront one-another when overlapped, the strip on one of said flaps being disposed transverse to the strip on the other of said flaps to facilitate retention of the closure flaps enveloping said joint.

19. The collar recited in claim 1 including a plurality of circumferential sealing bands constructed and arranged surround the outer surface of said collar to compress the sheath against the outer surface of the joint and adjacent pipeline portions to confine the sealant introduced through said passage means.

20. A method of remotely sealing a joint between pipeline segments located at a depth greater than arms length below the ground surface, comprising the steps of:
   a) exposing the joint and adjacent portions of the pipeline on opposed sides of the joint by preparing an excavation extending from the ground surface to the joint;
   b) providing a flexible sheath with closure flaps at its ends having eyelet means formed therein and an intermediate body adapted to form a mold collar conforming to the outline of the joint and the adjacent pipeline portions, and remotely encasing the joint with the sheath by using grappling means to engage said eyelet means and overlap said closure flaps and wrap the sheath around the joint without physically entering the excavation;
   c) retaining said closure flaps overlapped and installing sealing bands around the collar in the area of the adjacent pipeline portions to seal the ends of the collar against said portions;
   d) infusing sealant into the installed mold collar and allowing the sealant to cure and to form a leak-proof seal around the joint; and
   e) filling the excavation with said mold collar installed around the joint and adjacent pipeline.

21. The method of remotely sealing a joint as recited in claim 20 wherein the sheath body has resilient circular clips causing said body to conform to the pipeline portions, and wherein the step of remotely encasing the joint includes retaining said sheath enveloping the joint and adjacent pipeline portions by said resilient clips which can be opened and closed around the joint and adjacent pipeline portions.

22. The method of remotely sealing a joint as recited in claim 21 wherein the step of remotely encasing the joint includes initially positioning the sheath around said joint with guide lines.

23. The method of remotely sealing a joint as recited in claim 22 wherein the step of initially positioning the sheath includes guiding a first guide line from the ground surface down the excavation, around the underside of the joint, and up the excavation to the ground surface, attaching one side of the flexible sheath to the first guide line and the other side of the sheath to a second guide line, and then guiding the flexible sheath from the ground surface to the underside of said joint with said first and second guide lines.

24. The method of remotely sealing a joint as recited in claim 23 wherein the steps of opening and partially installing the sheath include pulling the sides of the flexible collar in opposed, upward directions about the underside of the joint using said guide lines until the sheath envelops the underside of the outer surface of the joint and adjacent pipeline portions, and said clips resiliently retain said sheath in position.

25. The method of remotely sealing a joint as recited in claim 24 further including the steps of fully installing the collar by overlapping the closure flaps from opposite sides of said body so as to envelop the entire outer surface of the joint with the collar and sealing the collar around the joint and adjacent pipeline portions.

26. The method of remotely sealing a joint as recited in claim 25 wherein the steps of enveloping and sealing the collar comprise retaining the closure flaps overlapped on said joint and installing sealing bands around the circumference of the collar using grappling tools.

27. The method of remotely sealing a joint as recited in claim 20 wherein the flexible sheath has a passage introducing a sealant into the interior of said collar, said step of infusing sealant into the mold collar includes connecting an infusion hose between said infusion passage and a source of sealant at the ground surface.

28. The method of remotely sealing a joint as recited in claim 27 wherein said flexible sheath includes a vacuum port, and further including the step of connecting a vacuum hose between a vacuum port in the mold collar and a vacuum source at the ground surface, and simultaneously infusing sealant into the interior of the mold collar through the infusion passage and evacuating air out of the interior of the mold collar through the vacuum port.

29. The method of remotely sealing a joint as recited in claim 20 wherein the step of exposing the joint comprises preparing an excavation having lengthwise and widthwise dimensions only slightly larger than the lengthwise and widthwise dimensions of the joint and smaller than the dimensions necessary to accommodate the physical presence of a workman.

* * * * *

UNITED STATES PATENT AND TRADEMARK OFFICE
CERTIFICATE OF CORRECTION

PATENT NO. : 5,413,385
DATED : May 9, 1995
INVENTOR(S) : Edward O. Hilbush, III

It is certified that error appears in the above-indentified patent and that said Letters Patent is hereby corrected as shown below:

Column 2, line 30, "pipelineion" should be --pipeline on--;

Column 4, line 59, "8a" should be --48a--;

Column 9, lines 10-11, "vacuum" should be --exhaust--;

Column 10, line 4, "vacuum" should be --exhaust--.

Signed and Sealed this

Twenty-fifth Day of July, 1995

Attest:

BRUCE LEHMAN

Attesting Officer     Commissioner of Patents and Trademarks